United States Patent
Gallagher et al.

(10) Patent No.: US 7,490,180 B2
(45) Date of Patent: *Feb. 10, 2009

(54) METHOD, SYSTEM, AND COMPUTER PROGRAM PRODUCT FOR DYNAMICALLY SELECTING SOFTWARE BUFFERS FOR AGGREGATION ACCORDING TO CURRENT SYSTEM CHARACTERISTICS

(75) Inventors: James R. Gallagher, Austin, TX (US); Ron Encarnacion Gonzalez, Austin, TX (US); Binh K. Hua, Austin, TX (US); Sivarama K. Kodukula, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/972,776

(22) Filed: Jan. 11, 2008

(65) Prior Publication Data
US 2008/0133796 A1 Jun. 5, 2008

Related U.S. Application Data

(62) Division of application No. 10/798,934, filed on Mar. 11, 2004.

(51) Int. Cl.
*G06F 3/00* (2006.01)
*G06F 3/06* (2006.01)
*G06F 5/00* (2006.01)

(52) U.S. Cl. .......................... 710/54; 710/10; 710/15; 710/16; 710/18; 710/52; 710/56; 710/57; 370/300; 370/470; 370/473; 370/474; 370/476

(58) Field of Classification Search ....................... None
See application file for complete search history.

(56) References Cited

U.S. PATENT DOCUMENTS

| | | | |
|---|---|---|---|
| 5,870,628 A | 2/1999 | Chen et al. |
| 5,881,248 A | 3/1999 | Mergard |
| 5,894,560 A | 4/1999 | Carmichael et al. |
| 5,987,479 A | 11/1999 | Oliver |
| 6,182,200 B1 | 1/2001 | Duvall et al. |
| 6,477,610 B1 | 11/2002 | Willenborg |
| 6,629,158 B1 | 9/2003 | Brant et al. |
| 6,665,753 B1 | 12/2003 | Buckland et al. |
| 2001/0018719 A1 | 8/2001 | Francis |
| 2005/0027901 A1 | 2/2005 | Simon et al. |

OTHER PUBLICATIONS

Ewert et al., "Optimizing Software Performance for IP Frame Reassembly in an Integrated Architecture", ACM 2000, Ontario, Canada, pp. 29-37.
Druschel et al., "Fbufs: A High-Bandwidth Cross-Domain Transfer Facility", ACM 1993, USA, pp. 189-202.

*Primary Examiner*—Tanh Q Nguyen
(74) *Attorney, Agent, or Firm*—Duke W. Yee; Diana L. Roberts-Gerhardt; Lisa L. B. Yociss (57) ABSTRACT

A method, system, and computer program product in a data processing system are disclosed for dynamically selecting software butters for aggregation in order to optimize system performance. Data to be transferred to a device is received. The data is stored in a chain of software buffers. Current characteristics of the system are determined. Software buffers to be combined are then dynamically selected. This selection is made according to the characteristics of the system in order to maximize performance of the system.

15 Claims, 4 Drawing Sheets

| CPU | | MEMORY ACCESS LATENCY | DMA CAPABILITY | | AGGREGATION THRESHOLD |
|---|---|---|---|---|---|
| NUMBER | SPEED | | WIDTH | SPEED | |
| 4 | 1.45 MHz | 5 MICROSECONDS | 32 BITS | 33 MHz | 2049 BYTES |
| | | | | 66 MHz | 1792 BYTES |
| | | | | 133 MHz | 1408 BYTES |
| | | | 64 BITS | 33 MHz | 1792 BYTES |
| | | | | 66 MHz | 1408 BYTES |
| | | | | 133 MHz | 1025 BYTES |

METHOD, SYSTEM, AND COMPUTER PROGRAM PRODUCT FOR DYNAMICALLY SELECTING SOFTWARE BUFFERS FOR AGGREGATION ACCORDING TO CURRENT SYSTEM CHARACTERISTICS

This application is a divisional of application Ser. No. 10/798,934, filed Mar. 11, 2004, status pending.

BACKGROUND OF THE INVENTION

1. Technical Field

The present invention is directed to an improved data processing system. More specifically, the present invention is directed to a method, system, and computer program product for dynamically determining, prior to transferring data using a chain of buffers in which the data is stored, whether to aggregate buffers by combining selected buffers according to current system capabilities to create a new chain of buffers.

2. Description of Related Art

For high speed I/O adapters, data is typically transferred from the system memory to the adapter using the Direct Memory Access (DMA) transfer method because it usually minimizes CPU utilization and increases the I/O bus bandwidth, generally resulting in overall operating efficiencies. However, the overhead required to set up the DMA makes this method better suited for large contiguous data transfers. If the data is scattered across several small buffers, the efficiency of the DMA decreases due to the necessity of having to physically program the DMA engine for each individual buffer.

To illustrate this point, consider that during normal TCP/IP communications, the protocol stack delivers a packet to the networking adapter driver for transfer out to the network. To avoid a memory copy from the TCP/IP buffer to the driver buffer, the packet is constructed into more than one buffer (i.e. one for the TCP/IP header and at least one for the payload). In some cases, the packet can be further scattered across multiple buffers. As stated above, the DMA setup is CPU consuming, which can vary from system to system, depending on the number of bridges and I/O bus bandwidth. This results in diminished memory and I/O bus performance that can be exacerbated if the data is not aligned to the cache line on each of these buffers.

A solution to this problem is to reduce the number of DMA transactions by aggregating the data from these small buffers into a big contiguous system buffer through copying. However, the additional work to aggregate the data into a single buffer results in the use of extra CPU cycles. This may not be tolerable if the system does not have enough available CPU cycles.

Clearly, the method to aggregate by copying all the small buffers into one big contiguous buffer, and the method that delivers multiple small buffers packets to the adapter for DMA transfers are not always good for all systems. In the former case, the I/O and memory latencies may not be tolerable due to insufficient memory and I/O bandwidth. In the latter case, additional CPU cycles may not be available in some systems.

Therefore, a need exists for a method, system, and computer program product for dynamically selecting, prior to transferring data stored in a chain of separate software buffers, ones of these buffers in the buffer chain to aggregate by combining the selected buffers to form a new buffer chain of buffers according to current system capabilities.

SUMMARY OF THE INVENTION

A method, system, and computer program product in a data processing system are disclosed for dynamically selecting software buffers for aggregation in order to optimize system performance. Data to be transferred to a device is received. The data is stored in a chain of software buffers. Current characteristics of the system are determined. Software buffers to be combined are then dynamically selected. This selection is made according to the characteristics of the system in order to maximize performance of the system.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and computer program product for dynamically determining according to current system capabilities, prior to transferring a chain of buffers in which data to be transferred is stored, whether to aggregate buffers in the buffer chain by combining selected buffers to form a chain of modified buffers in which the data is stored.

When the system performance is limited by the capabilities of the I/O subsystem, i.e. I/O adapter and/or size of the slot into which the adapter is inserted, smaller buffers will be aggregated to create larger buffers that are used in order to avoid the DMA overhead on the I/O bus. When the system performance is limited by the processor capacity, aggregation is restricted so that the original, smaller buffers are used to transfer the data.

A threshold is assigned to each possible combination of I/O adapter and slot size. Thus, a threshold is determined for each speed of I/O adapter in each width of I/O slot for a given set of system characteristics. Thereafter, during processing, each time data is to be transferred to an I/O adapter, the threshold that is assigned to that speed of adapter and the slot size in which that adapter resides is used to dynamically select software buffers to be combined.

The data to be transferred to an I/O adapter will typically reside in one or more software buffers that may vary in size. The combination of the software buffers that contain the data to be transferred are referred to as a buffer chain. This is a chain of software buffers in which is stored all of the data that is to be transferred.

For each buffer in the buffer chain, if a buffer is smaller or equal to the threshold, the contents of the buffer will be combined with the contents of one or more other buffers in the chain until the threshold is reached. This is referred to as aggregating these buffers.

Buffers that are greater than the threshold are left alone in the buffer chain. In this manner, a new buffer chain is created that will include buffers from the original buffer chain that exceeded the threshold as well as the newly created aggregated buffers.

A threshold is set for each combination of I/O adapter speed and slot size in combination with particular system performance characteristics. The following factors are used to set a threshold: (1) the number of CPUs in the system and their respective speeds; (2) the access latency of the memory subsystem; and (3) the DMA capability of each I/O adapter.

Those skilled in the art will recognize that any method may be used to set a threshold using these factors. A threshold may first be assigned and then later adjusted in order to fine tune the performance of the system. Typically, the thresholds are set according to the best judgment of a design engineer.

The number of CPUs, the speed of the CPUs, and the access latency of the memory subsystem are posted by the system's firmware and operating system during system Initial Program Load (IPL). The system firmware and operating system updates the number and speed of CPUs in the system and the memory access latency of the system based on the system model. The I/O adapter DMA capability is determined when the I/O adapter is initialized.

Figure 1:
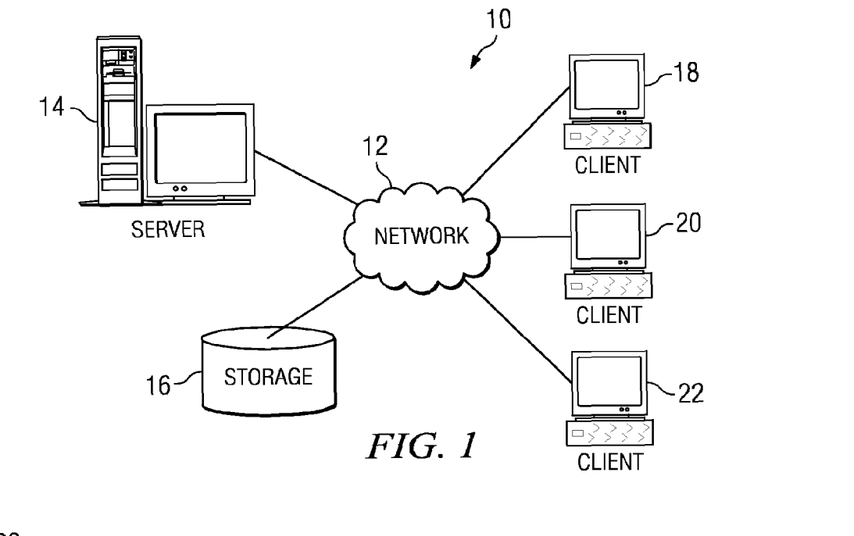
FIG. 1 is a pictorial representation which depicts a network of data processing systems that includes the present invention in accordance with the present invention.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18-22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
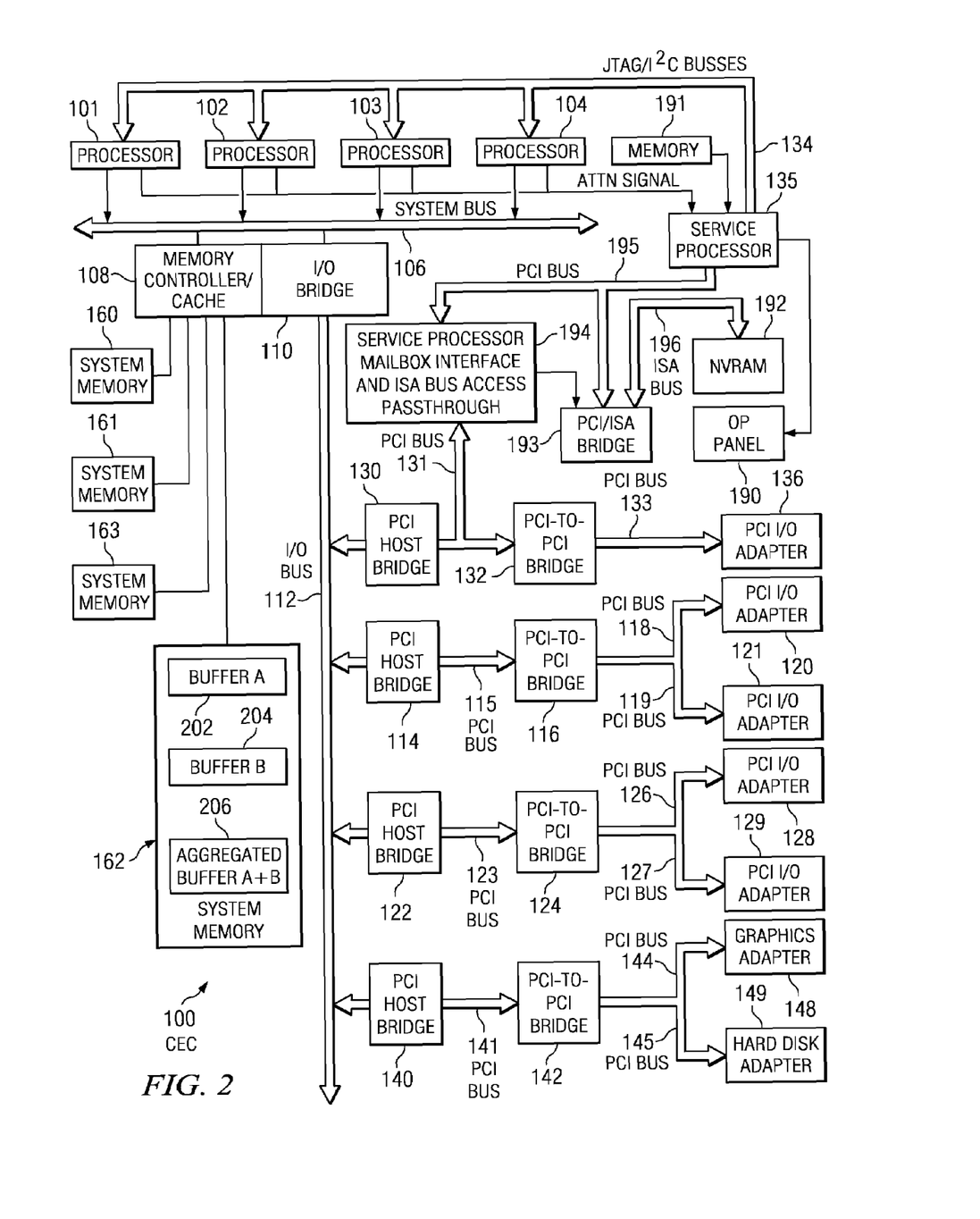
FIG. 2 is a more detailed illustration of a computer system that includes the present invention that may be used to implement any of the computer systems of FIG. 1 in accordance with the present invention.

FIG. 2 is a more detailed block diagram of a central electronic complex (CEC) within a data processing system in which the present invention may be implemented. CEC 100 may include a plurality of processors 101, 102, 103, and 104 connected to system bus 106. Alternatively, a single processor system may be employed. Also connected to system bus 106 is memory controller/cache 108, which provides an interface to a plurality of system memories 160-163. I/O bus bridge 110 is connected to system bus 106 and provides an interface to I/O bus 112. Memory controller/cache 108 and I/O bus bridge 110 may be integrated as depicted.

Each system memory 160-163 may include one or more software buffers that are used to store data. For example, system memory 162 includes a buffer A 202 and a buffer B 204. According to the present invention, these buffers may be combined by copying the data from each buffer into a new, larger buffer. For example, the data from buffer A 202 may be copied into a larger buffer 206. In addition, the data from buffer B 204 may also be copied into buffer 206. Thus, buffer A 202 and buffer B 204 are aggregated by combining the contents of the original buffers into a new buffer A+B 206. Buffer 206 is the size of buffer A 202 plus the size of buffer B 204.

CEC 100 is a logically partitioned data processing system. Thus, CEC 100 may have multiple heterogeneous operating systems (or multiple instances of a single operating system) running simultaneously. Each of these multiple operating systems may have any number of software programs executing within it. CEC 100 is logically partitioned such that different I/O adapters 120-121, 128-129, 136, and 148-149 may be assigned to different logical partitions.

Thus, for example, suppose CEC 100 is divided into three logical partitions, P1, P2, and P3. Each of I/O adapters 120-121, 128-129, 136, and 148-149, each of processors 101-104, and each of system memories 160-163 is assigned to one of the three partitions. For example, processor 101, memory 160, and I/O adapters 120, 128, and 129 may be assigned to logical partition P1; processors 102-103, memory 161, and I/O adapters 121 and 136 may be assigned to partition P2; and processor 104, memories 162-163, and I/O adapters 148-149 may be assigned to logical partition P3.

Each operating system executing within CEC 100 is assigned to a different logical partition. Thus, each operating system executing within CEC 100 may access only those I/O units that are within its logical partition.

Peripheral component interconnect (PCI) Host bridge 114 connected to I/O bus 112 provides an interface to PCI local bus 115. A number of Input/Output adapters 120-121 may be connected to PCI bus 115. Typical PCI bus implementations will support between four and eight I/O adapters (i.e. expansion slots for add-in connectors). Each I/O Adapter 120-121 provides an interface between CEC 100 and input/output devices such as, for example, other network computers.

An additional PCI host bridge 122 provides an interface for an additional PCI bus 123. PCI bus 123 is connected to a plurality of PCI I/O adapters 128-129 by a PCI bus 126-127. Thus, additional I/O devices, such as, for example, modems or network adapters may be supported through each of PCI I/O adapters 128-129. In this manner, CEC 100 allows connections to multiple network computers.

A memory mapped graphics adapter 148 may be connected to I/O bus 112 through PCI Host Bridge 140 and PCI-PCI bridge 142 via PCI buses 144 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and PCI-PCI bridge 132. The ISA bus access pass-through logic 194 forwards PCI accesses destined to the PCI/ISA bridge 193. The NVRAM storage is connected to the ISA bus 196. The Service processor 135 is coupled to the service processor mailbox interface 194 through its local PCI bus 195. Service processor 135 is also connected to processors 101-104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When CEC 100 is initially powered up, service processor 135 uses the JTAG/scan buses 134 to interrogate the system (Host) processors 101-104, memory controller 108, and I/O bridge 110. At completion of this step, service processor 135 has an inventory and topology understanding of CEC 100. Service processor 135 also executes Built-In-Self-Tests (BISTs), Basic Assurance Tests (BATs), and memory tests on all elements found by interrogating the system processors 101-104, memory controller 108, and I/O bridge 110. Any error information for failures detected during the BISTs, BATs, and memory tests are gathered and reported by service processor 135.

Service processor 135 is responsible for saving and reporting error information related to all the monitored items in CEC 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for reconfiguration during the current running session and future Initial Program Loads (IPLs). IPLs are also sometimes referred to as a "boot" or "bootstrap".

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
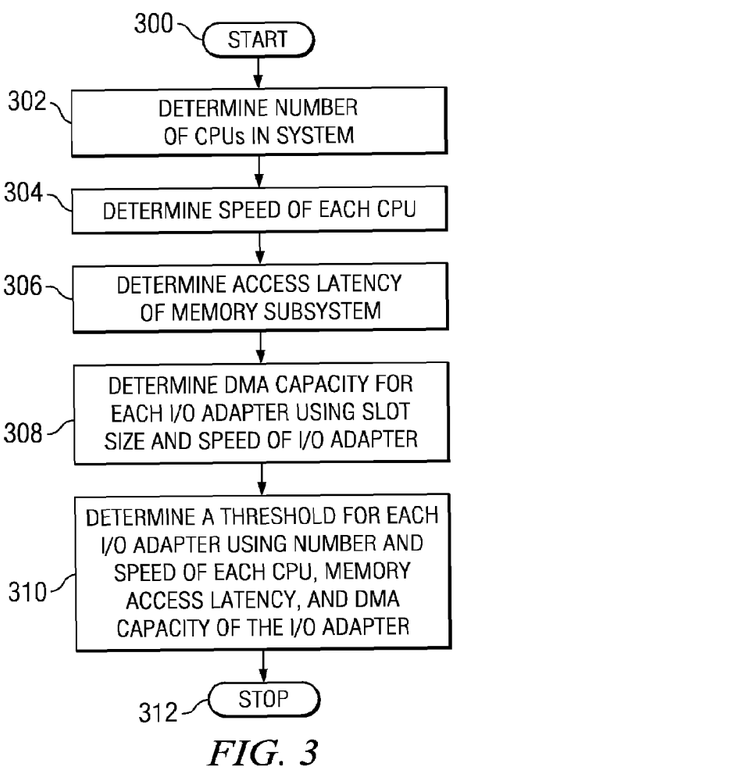
FIG. 3 illustrates a high level flow chart that depicts determining system characteristics and setting an aggregation threshold for each I/O adapter in accordance with the present invention.

FIG. 3 depicts a high level flow chart which illustrates determining system characteristics and setting an aggregation threshold for each I/O adapter in accordance with the present invention. The process starts as depicted by block 300 and thereafter passes to block 302 which illustrates determining the number of processors, also called CPUs, in the data processing system. Next, block 304 depicts determining the speed of each processor (CPU). Thereafter, block 306 illustrates determining the access latency of the memory subsystem. The memory subsystem includes memory controller/cache 108 and system memory 162.

Block 308, then, depicts determining the DMA capacity for each I/O adapter. This determination is made using the slot size and the speed of each I/O adapter that may be inserted into each slot. Thereafter, block 310 illustrates determining a threshold for each I/O adapter using the number and speed of each processor, the memory access latency, and the DMA capacity of the I/O adapter considering the size of the slot into which the I/O adapter is inserted. The process then terminates as depicted by block 312.

Figure 4:
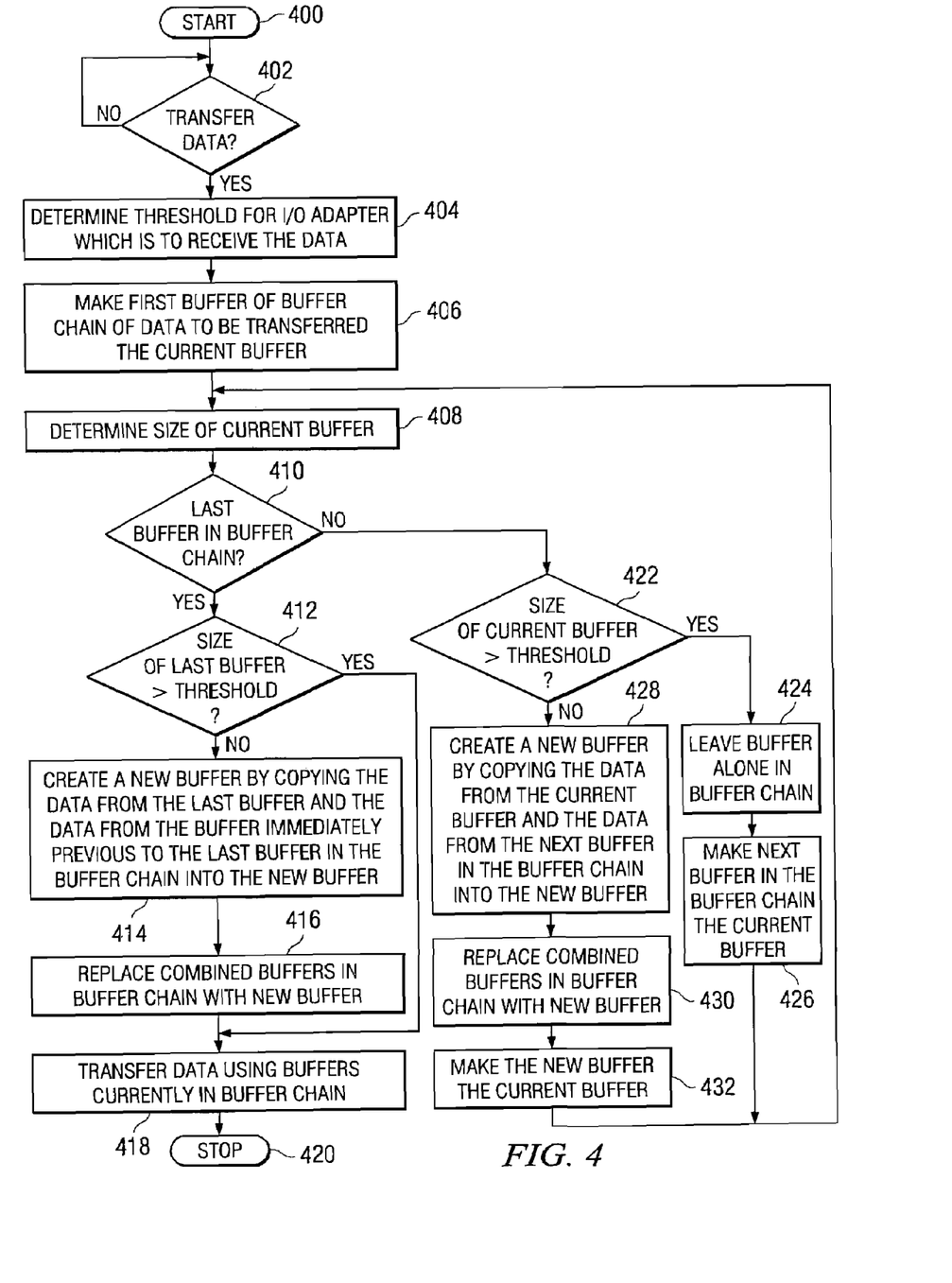
FIG. 4 depicts optimizing I/O throughput and CPU utilization by dynamically configuring software buffers considering the performance impact of buffer aggregation in accordance with the present invention.

FIG. 4 illustrates a high level flow chart which depicts optimizing I/O throughput and CPU utilization by dynamically configuring software buffers considering the performance impact of buffer aggregation in accordance with the present invention. The process starts as depicted by block 400 and thereafter passes to block 402 which illustrates a determination of whether or not data is to be transferred. If a determination is made that no data is to be transferred, the process passes back to block 402. If a determination is made that data is to be transferred, the process passes to block 404 which depicts determining the threshold for the I/O adapter that is to receive the data. Next, block 406 illustrates making the first buffer of the chain of buffers to be transferred the current buffer.

The process then passes to block 408 which depicts determining the size of the current buffer. Thereafter, block 410 illustrates a determination of whether or not this is the last buffer in the buffer chain that holds data to be transferred. If a determination is made that this is the last buffer in the buffer chain, the process passes to block 412 which depicts a determination of whether or not the size of the last buffer is greater than the threshold. If a determination is made that the size of the last buffer is greater than the threshold, the process passes to block 418.

Referring again to block 412, if a determination is made that the size of the last buffer is not greater than the threshold, the process passes to block 414 which illustrates creating a new buffer by copying the data stored in the last buffer and the data stored in the next to last buffer, i.e. the immediately previous buffer in the buffer chain, to form the new buffer. Thus, the last buffer and the next to last buffer in the buffer chain are selected and are aggregated. The process then passes to block 416 which depicts replacing in the buffer chain the buffers selected for aggregation with the new buffer. The process then passes to block 418 which illustrates transferring the data using the buffers that are currently in the buffer chain. The process then terminates as illustrated by block 420.

Referring again to block 410, if a determination is made that this is not the last buffer in the buffer chain, the process passes to block 422 which illustrates a determination of whether the size of the current buffer is greater than the threshold that was determined for this I/O adapter. If a determination is made that the size of the current buffer is greater than the threshold determined for this I/O adapter, the process passes to block 424 which depicts leaving this current buffer alone in the buffer chain. Thus, the data stored in this buffer is not aggregated with another buffer, and this buffer remains unchanged in the buffer chain. Block 426, then, illustrates making the next buffer in the buffer chain the current buffer. The process then passes back to block 408.

Referring again to block 422, if a determination is made that the size of the current buffer is not greater than the threshold, the process passes to block 428 which depicts creating a new buffer by copying the contents of, i.e. the data stored in, the current buffer and the contents of, i.e. the data stored in, the next buffer in the buffer chain into a new, bigger buffer. Thus, these two buffers are selected for aggregation and their contents are aggregated by being copied into a new buffer.

Block 430, then, illustrates replacing, in the buffer chain, the buffers selected for aggregation with the new, larger buffer. Thus, those buffers that were combined are no longer in the buffer chain. Instead of the combined buffers, the buffer chain now contains the new buffer. Thereafter, block 432 depicts making the new buffer the current buffer. The process then passes to block 408.

Figure 5:
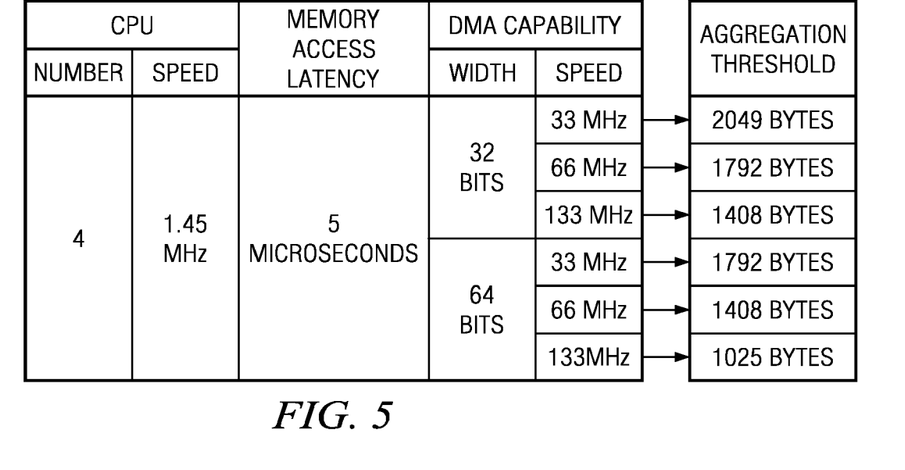
FIG. 5 illustrates a block diagram of system and I/O adapter characteristics and the resulting thresholds that are assigned to each combination of these system and I/O adapter characteristics in accordance with the present invention.

FIG. 5 depicts a block diagram of system and I/O adapter characteristics and the resulting thresholds that are assigned to each combination of these system and I/O adapter characteristics in accordance with the present invention. For example, the system includes four processors, each operating at 1.45 MHz. The memory access latency for the memory subsystem is 5 microseconds.

An I/O adapter may be inserted into either a 32 bit wide slot or a 64 bit wide slot. When an I/O adapter that is capable of transferring data at 33 MHz is inserted into a 32 bit-wide slot, a threshold of 2049 bytes has been assigned. A threshold of 1792 bytes has been assigned when an I/O adapter that is capable of transferring data at 66 MHz is inserted into a 32 bit wide slot. When an I/O adapter that is capable of transferring data at 133 MHz is inserted into a 33-bit wide slot, a threshold of 1408 bytes has been assigned.

When an I/O adapter that is capable of transferring data at 33 MHz is inserted into a 64-bit wide slot, a threshold of 1792 bytes has been assigned. A threshold of 1408 bytes has been assigned when an I/O adapter that is capable of transferring data at 64 MHz is inserted into a 64-bit wide slot. When an I/O adapter that is transferring data at 133 MHz is inserted into a 64-bit wide slot, a threshold of 1025 bytes has been assigned.

Those skilled in the art will recognize that FIG. 5 depicts just one example of threshold values that may be assigned. Any other threshold value may be used for these combinations of I/O adapter and system characteristics.

Figure 6A:
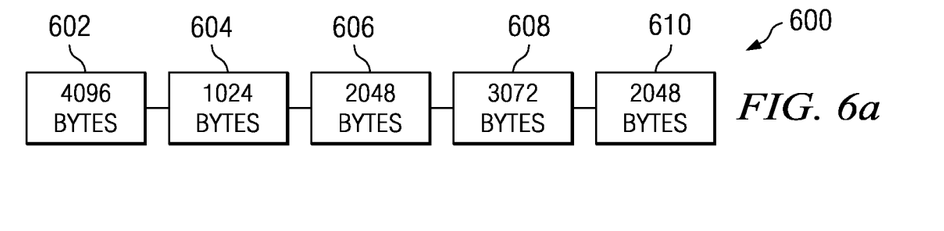
FIG. 6a illustrates a chain of original buffers that store data that is to be transmitted to an I/O adapter in accordance with the present invention.

FIG. 6a illustrates a chain of buffers that store data that is to be transmitted to an I/O adapter in accordance with the present invention. The entire 12 Kbytes of data that is to be transferred, according to this example, is stored in a buffer chain 600. Buffer chain 600 currently includes five buffers. Thus, the 12 Kbytes of data are distributed throughout the five buffers. A total of 4096 bytes are stored in a first buffer 602 in chain 600. A total of 1024 bytes are stored in a second buffer 604 in chain 600. A total of 2048 bytes are stored in a third buffer 606 in chain 600. A total of 3072 bytes are stored in a fourth buffer 608 in chain 600. And, a total of 2048 bytes are stored in a fifth buffer 610 in chain 600.

Figure 6B:
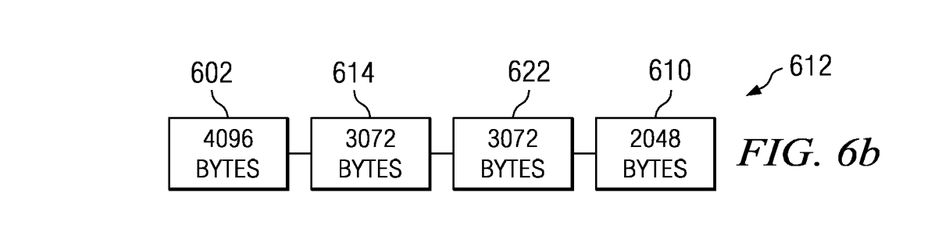
FIG. 6b depicts a chain of modified buffers that store data that is to be transmitted to a first I/O adapter in accordance with the present invention.

FIG. 6b depicts a chain of modified buffers that store data that is to be transmitted to a first I/O adapter in accordance with a first example of the present invention.

The following is an example of determining whether one or more, and which ones, of the buffers in the buffer chain 600 should be aggregated in order to optimize the performance of the system when the 12 Kbytes of data are to be transferred to a particular I/O adapter. When buffers are aggregated, the contents of the selected buffers are copied into a new buffer that is the size of that total of both of the original selected buffers.

For the first example, the 12 Kbytes of data are to be transferred to an adapter A that is capable of transferring data at 133 MHz and that is inserted in a 64 bit wide slot. The buffer aggregation threshold assigned to this I/O adapter in the system having the characteristics depicted by FIG. 5 is 1025 bytes.

The present invention may be used to dynamically determine whether it would optimize the system and I/O adapter to combine two or more of the buffers in buffer chain 600. In addition, the present invention may be used to dynamically select the buffers to combine in order to optimize the system and adapters.

Thus, following the example, the 12 Kbytes of data are to be transferred to I/O adapter A. The 12 Kbytes of data are originally stored in buffer chain 600. After completion of the present invention, a new buffer chain 612, as depicted by FIG. 6b, is created. Buffer chain 612 will then be used when transferring the 12 Kbytes of data to adapter A.

The first buffer 602 is evaluated. Buffer 602 stores 4096 bytes of data. The threshold of adapter A is 1025 bytes. Therefore, because the contents of buffer 602 are greater than the threshold for adapter A, the contents of buffer 602 will not be combined, or aggregated, with the contents of any other buffer. Buffer 602 is then left alone in the new buffer chain 612 as depicted by FIG. 6b.

Next, buffer 604 is considered. The contents of buffer 604 require 1024 bytes of storage. Because the contents of buffer 604 are less than the threshold for adapter A, the contents of buffer 604 will be combined with the contents of the next buffer in the chain, buffer 606. Therefore, the contents of buffer 604 and the contents of buffer 606 will be copied into a new buffer, buffer 614. Buffer chain 612, as depicted by FIG. 6b, now includes buffer 614 and does not include buffers 604 or 606. Buffer 614 replaces buffers 604 and 606 in the new buffer chain 612. Buffer 614 stores the contents of buffers 604 and 606, and is thus 3182 bytes.

Next, buffer 608 is considered. Buffer 608 stores 3072 bytes of data. Because buffer 608 contains 3072 bytes which is greater than the threshold for adapter A, the contents of buffer 608 are not combined with another buffer and remain in buffer 608. Thus, buffer chain 612 includes original buffer 608.

Buffer 610 is considered next. Buffer 610 contains 2048 bytes which is greater than the threshold for adapter A. Therefore, buffer 610 remains unchanged. The contents of buffer 610 are not combined with another buffer and remain in buffer 610. Thus, buffer chain 612 includes original buffer 610.

The data is then transferred to adapter A using buffer chain 612 which now includes four buffers instead of the original five buffers.

Figure 6C:
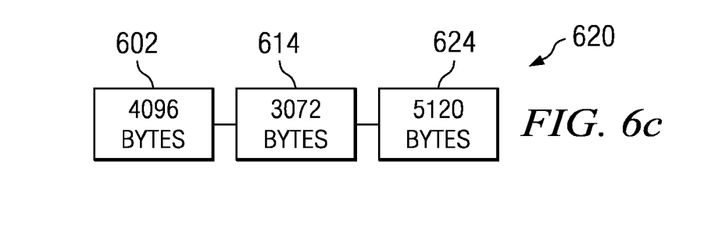
FIG. 6c illustrates a chain of modified buffers that store data that is to be transmitted to a second I/O adapter in accordance with the present invention.

For the second example, the 12 Kbytes of data are to be transferred to an adapter B that is capable of transferring data at a rate of 33 MHz and that is inserted in a 32 bit-wide slot. The buffer aggregation threshold assigned to this I/O adapter in the system having the characteristics depicted by FIG. 5 is 2049 bytes. The 12 Kbytes of data are originally stored in buffer chain 600. After completion of the present invention, a new buffer chain 620, as depicted by FIG. 6c, is created. Buffer chain 620 will then be used when transferring the 12 Kbytes of data to adapter B.

The threshold of adapter B is 2049 bytes. Thus, the data stored in buffer 602 will not be copied, or aggregated, because the size of the data, 4096 bytes, is greater than the threshold of 2049 bytes. Therefore, buffer 602 remains unchanged. The contents of buffer 602 are not combined with another buffer and remain in buffer 602. Thus, buffer chain 620 includes original buffer 602.

Next, buffer 604 is considered. The data stored in buffer 604 requires 1024 bytes. The contents of buffer 604 should be combined with another buffer. Buffer 606 is then considered. Buffer 606 stores 2048 bytes. The combination of buffers 604 and 606 is now 3072 bytes which is greater than the threshold. Therefore, buffer 622 is created into which is copied the contents stored in original buffers 604 and 606. Buffer chain 620 now includes buffer 622 which replaces buffers 604 and 606. Buffer chain 620 does not include buffers 604 or 606.

Next, buffer 608 is considered. The data stored in buffer 608 requires 3072 bytes, and, thus, does not need to be combined. Buffer 610, is then considered. The contents of buffer 610 require only 2048 bytes. Because this is less than the threshold for adapter B and because buffer 610 is the last buffer in chain 600, buffer 610 is combined with the previous buffer, buffer 608, to create a new buffer, buffer 624, which stores the 5120 bytes of original buffers 608 and 610.

The data is then transferred to adapter B using buffer chain 620 which now includes three buffers instead of the original five buffers.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method in a data processing system for dynamically selecting software buffers for aggregation in order to optimize system performance, wherein said data processing system comprises a processor and an I/O subsystem and wherein said I/O subsystem comprises I/O adapters and I/O slots, said method comprising:

assigning a threshold for each possible combination of I/O adapter speed and width of I/O slot;

receiving data, which is stored in a chain of software buffers, to be transferred to a particular I/O adapter that resides in a particular I/O slot;

determining a speed of said particular I/O adapter and a width of said particular I/O slot;

determining a particular threshold assigned for a combination of said speed of said particular I/O adapter and said width of said particular I/O slot;

determining current characteristics of said system; and using said particular threshold to dynamically select software buffers of said chain of software buffers to aggregate to maximize performance of said system while said data is being transferred.

2. The method according to claim 1, further comprising:

determining whether said system is more limited by its I/O subsystem capacity or its processor capacity;

in response to a determination that said system is more limited by its I/O subsystem capacity, increasing a level of aggregation of software buffers; and in response to a determination that said system is more limited by its processor capacity, restricting said level of aggregation of software buffers.

3. A data processing system for dynamically selecting software buffers for aggregation in order to optimize system performance, said system comprising:

a processor;

an I/O subsystem comprising I/O adapters and I/O slots;

a threshold assigned for each possible combination of I/O adapter speed and width of I/O slot;

a device for receiving data to be transferred to a particular I/O adapter that resides in a particular I/O slot, said data being stored in a chain of software buffers;

a CPU executing code for determining a speed of said particular I/O adapter and a width of said particular I/O slot;

said CPU executing code for determining a particular threshold assigned for a combination of said speed of said particular I/O adapter and said width of said particular I/O slot;

said CPU executing code for determining current characteristics of said system; and said CPU executing code for using said particular threshold to dynamically select software buffers of said chain of software buffers to aggregate to maximize performance of said system while said data is being transferred.

4. The system according to claim 3, further comprising:

said CPU executing code for determining whether said system is more limited by its I/O subsystem capacity or its processor capacity;

in response to a determination that said system is more limited by its I/O subsystem capacity, increasing a level of aggregation of software buffers; and in response to a determination that said system is more limited by its processor capacity, restricting said level of aggregation of software buffers.

5. A computer program product, which is stored in a computer recordable-type medium, for dynamically selecting software buffers for aggregation in a data processing system in order to optimize system performance, wherein said data processing system comprises a processor and an I/O subsystem and wherein said I/O subsystem comprises I/O adapters and I/O slots, said product comprising:
- instruction means for assigning a threshold for each possible combination of I/O adapter speed and width of I/O slot;
- instruction means for receiving data to be transferred to a particular I/O adapter that resides in a particular I/O slot, said data being stored in a chain of software buffers;
- instruction means for determining a speed of said particular I/O adapter and a width of said particular I/O slot;
- instruction means for determining a particular threshold assigned for a combination of said speed of said particular I/O adapter and said width of said particular I/O slot;
- instruction means for determining current characteristics of said system; and
- instruction means for using said particular threshold to dynamically select software buffers of said chain of software buffers to aggregate to maximize performance of said system while said data is being transferred.

6. The product according to claim 5, further comprising:
instruction means for determining whether said system is more limited by its I/O subsystem capacity or its processor capacity;
in response to a determination that said system is more limited by its I/O subsystem capacity, instruction means for increasing a level of aggregation of software buffers; and
in response to a determination that said system is more limited by its processor capacity, instruction means for restricting said level of aggregation of software buffers.

7. The method according to claim 1, further comprising:
assigning the threshold for each possible combination of I/O adapter speed and width of I/O slot using the number of CPUs in the system and their speeds, an access latency of a memory subsystem, and a DMA capability of each I/O adapter.

8. The method according to claim 1, further comprising:
evaluating a first buffer in said chain of software buffers;
if a size of said first buffer does not exceed said particular threshold, copying contents of said first buffer and contents of a second buffer in said software chain into a first new buffer;
evaluating said first new buffer;
if a size of said first new buffer does not exceed said particular threshold, copying contents of said first new buffer and contents of a third buffer in said software chain into a second new buffer.

9. The method according to claim 8, further comprising:
if a size of said first buffer does exceed said particular threshold, leaving said first buffer unchanged and evaluating said second buffer;
if a size of said second buffer does not exceed said particular threshold, copying contents of said second buffer and contents of said third buffer in said software chain into a third new buffer;
evaluating said third new buffer;
if a size of said third new buffer does not exceed said particular threshold, copying contents of said third new buffer and contents of a fourth buffer in said chain into a fourth new buffer.

10. The system according to claim 3, further comprising:
said CPU executing code for assigning the threshold for each possible combination of I/O adapter speed and width of I/O slot using the number of CPUs in the system and their speeds, an access latency of a memory subsystem, and a DMA capability of each I/O adapter.

11. The system according to claim 3, further comprising:
said CPU executing code for evaluating a first buffer in said chain of software buffers;
said CPU executing code for if a size of said first buffer does not exceed said particular threshold, copying contents of said first buffer and contents of a second buffer in said software chain into a first new buffer;
said CPU executing code for evaluating said first new buffer;
said CPU executing code for if a size of said first new buffer does not exceed said particular threshold, copying contents of said first new buffer and contents of a third buffer in said software chain into a second new buffer.

12. The system according to claim 11, further comprising:
said CPU executing code for if a size of said first buffer does exceed said particular threshold, leaving said first buffer unchanged and evaluating said second buffer;
said CPU executing code for if a size of said second buffer does not exceed said particular threshold, copying contents of said second buffer and contents of said third buffer in said software chain into a third new buffer;
said CPU executing code for evaluating said third new buffer;
said CPU executing code for if a size of said third new buffer does not exceed said particular threshold, copying contents of said third new buffer and contents of a fourth buffer in said chain into a fourth new buffer.

13. The product according to claim 5, further comprising:
instruction means for assigning the threshold for each possible combination of I/O adapter speed and width of I/O slot using the number of CPUs in the system and their speeds, an access latency of a memory subsystem, and a DMA capability of each I/O adapter.

14. The product according to claim 5, further comprising:
instruction means for evaluating a first buffer in said chain of software buffers;
instruction means for if a size of said first buffer does not exceed said particular threshold, copying contents of said first buffer and contents of a second buffer in said software chain into a first new buffer;
instruction means for evaluating said first new buffer;
instruction means for if a size of said first new buffer does not exceed said particular threshold, copying contents of said first new buffer and contents of a third buffer in said software chain into a second new buffer.

15. The product according to claim 14, further comprising:
instruction means for if a size of said first buffer does exceed said particular threshold, leaving said first buffer unchanged and evaluating said second buffer;
instruction means for if a size of said second buffer does not exceed said particular threshold, copying contents of said second buffer and contents of said third buffer in said software chain into a third new buffer;
instruction means for evaluating said third new buffer;
instruction means for if a size of said third new buffer does not exceed said particular threshold, copying contents of said third new buffer and contents of a fourth buffer in said chain into a fourth new buffer.

* * * * *